(12) United States Patent
Naftel et al.

(10) Patent No.: US 8,738,871 B1
(45) Date of Patent: May 27, 2014

(54) METHOD AND APPARATUS FOR MAPPING VIRTUAL DRIVES

(75) Inventors: Timothy Michael Naftel, Longmont, CO (US); David Teater, Minneapolis, MN (US)

(73) Assignee: Symantec Corporation, Mountain View, CA (US)

( * ) Notice: Subject to any disclaimer, the term of this patent is extended or adjusted under 35 U.S.C. 154(b) by 210 days.

(21) Appl. No.: 11/824,478

(22) Filed: Jun. 29, 2007

(51) Int. Cl.
*G06F 12/16* (2006.01)
*G06F 11/14* (2006.01)

(52) U.S. Cl.
CPC ........ *G06F 11/1402* (2013.01); *G06F 11/1451* (2013.01)
USPC .......................................................... 711/162

(58) Field of Classification Search
CPC . G06F 11/14; G06F 11/1402; G06F 11/1412; G06F 11/1446; G06F 11/1448; G06F 11/1451; G06F 11/1458; G06F 11/1469; G06F 2201/84
USPC .......... 711/161–162; 707/202, 204, 609–686, 707/694–695; 714/6, 15, 20, 100, 1–3, 714/6.1–6.13
See application file for complete search history.

(56) References Cited

U.S. PATENT DOCUMENTS

| | | | |
|---|---|---|---|
| 6,141,773 A * | 10/2000 | St. Pierre et al. ............... | 714/20 |
| 6,832,330 B1 * | 12/2004 | Boudrie et al. ............... | 714/6.23 |
| 6,968,350 B2 | 11/2005 | Traut et al. ............................. | 1/1 |
| 7,440,965 B1 | 10/2008 | Pruthi et al. ........................... | 1/1 |
| 7,669,020 B1 | 2/2010 | Shah et al. ..................... | 711/162 |
| 7,707,185 B1 * | 4/2010 | Czezatke et al. .............. | 707/649 |
| 7,774,391 B1 | 8/2010 | Le et al. ........................ | 707/822 |
| 2004/0078636 A1 * | 4/2004 | Suzaki ............................. | 714/6 |
| 2005/0160150 A1 * | 7/2005 | Kao ............................... | 709/212 |
| 2005/0216788 A1 * | 9/2005 | Mani-Meitav et al. ........... | 714/6 |
| 2005/0228950 A1 * | 10/2005 | Karr ............................... | 711/114 |
| 2006/0130074 A1 | 6/2006 | Kumar .......................... | 719/324 |
| 2008/0104148 A1 * | 5/2008 | Schwaab et al. .............. | 707/204 |

* cited by examiner

*Primary Examiner* — April Y Blair
*Assistant Examiner* — Nicholas Simonetti
(74) *Attorney, Agent, or Firm* — Campbell Stephenson LLP

(57) ABSTRACT

A method and apparatus for creating and utilizing a map of files related to a virtual disk of a virtual machine. In one embodiment, the method comprises inspecting file system entries within at least one volume of the virtual disk; converting information related to file system entries into a map, where the map comprises file locations within a physical disk for the files related to the virtual disk. In another embodiment, the method comprises examining a map of an image of at least a portion of a virtual disk, accessing the image, extracting and utilizing at least one file. In yet another embodiment, the method comprises creating a map related to an image representing stored files in a virtual disk, storing the map and the image, selecting a file, examining the map, accessing the image, extracting the file from the image and restoring the file to a storage system.

11 Claims, 3 Drawing Sheets

METHOD AND APPARATUS FOR MAPPING VIRTUAL DRIVES

BACKGROUND OF THE INVENTION

1. Field of the Invention

The present invention generally relates to a technique for backing up and restoring data. More particularly, the present invention pertains to design and implementation of a method and apparatus for mapping virtual drives.

2. Description of the Related Art

Today's information technology (IT) administrators are faced with the daunting task of ensuring business continuity by protecting their company's data. This is owing to the fact that backup operations are becoming increasingly complex due to mixed environments, as well as the need for increased application availability that requires those applications to be backed up even while in use. Particularly, three key challenges facing IT administrators during backup operations are: incomplete backups, minimal or no backup window and application performance and availability during backup.

Traditional backup processing degrades the performance of other applications running on the server, and frequently requires a dedicated window of time when the system is unavailable to end-users.

Off-host backup is a backup operation that takes place on a host other than on the system hosting an application that reads or writes the data being backed up. For instance, VMWARE VIRTUAL MACHINE FILE SYSTEM (VMFS) allows a proxy server to backup a snapshot of a virtual machine while the virtual machine is simultaneously reading and writing to its storage.

Some of the key benefits of off-host backups include: backup load moved from the protected resource to the backup server, backup window effectively eliminated, data integrity of applications ensured prior to backup and minimum impact on the application server when performing off-host backups. However, in certain applications off-host backup too suffers from numerous problems.

In certain applications, there is a need to backup a virtual computer (GUEST OS) comprising a virtual drive array to a storage area network (SAN) or any other form of back-up device. For example, applications that demand performance of off-host backup of a VMWARE ESX GUEST OS onto SAN. Operationally, a copy of the GUEST OS (virtual computer/machine) is copied to the SAN. A backup proxy then backs up the GUEST OS which is a collection of files that make up the virtual drives, but can not access individual files of that GUEST OS. Since the data within the virtual drive is "virtualized", a physical mapping of where the data is stored is not available. As such, the backup software will create an image of all the files (or a selected volume of files) in the virtual drive and store them as a backup on the SAN. Consequently, upon restoration the entire image is restored from the SAN. If restoration of a single file is required, the image must be mounted, the file extracted and restored, then the image is dismounted. If the image is stored on tape, the process is very slow as the entire image is mounted from tape to facilitate restoring a single file.

Therefore, there is a need in the art for a method and apparatus for mapping virtual drives to facilitate individual file access from a virtual machine for such purposes as file restoration without mounting an entire image.

SUMMARY OF THE INVENTION

Embodiments of the present invention comprise a method and apparatus for creating a map of files related to a virtual disk of a virtual machine comprising inspecting file system entries within at least one volume of the virtual disk; converting information related to file system entries into a map, where the map comprises file locations within a physical disk for the files related to the virtual disk.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention are generally directed towards a method and apparatus for backing up computer files and restoring computer files.

Figure 1:
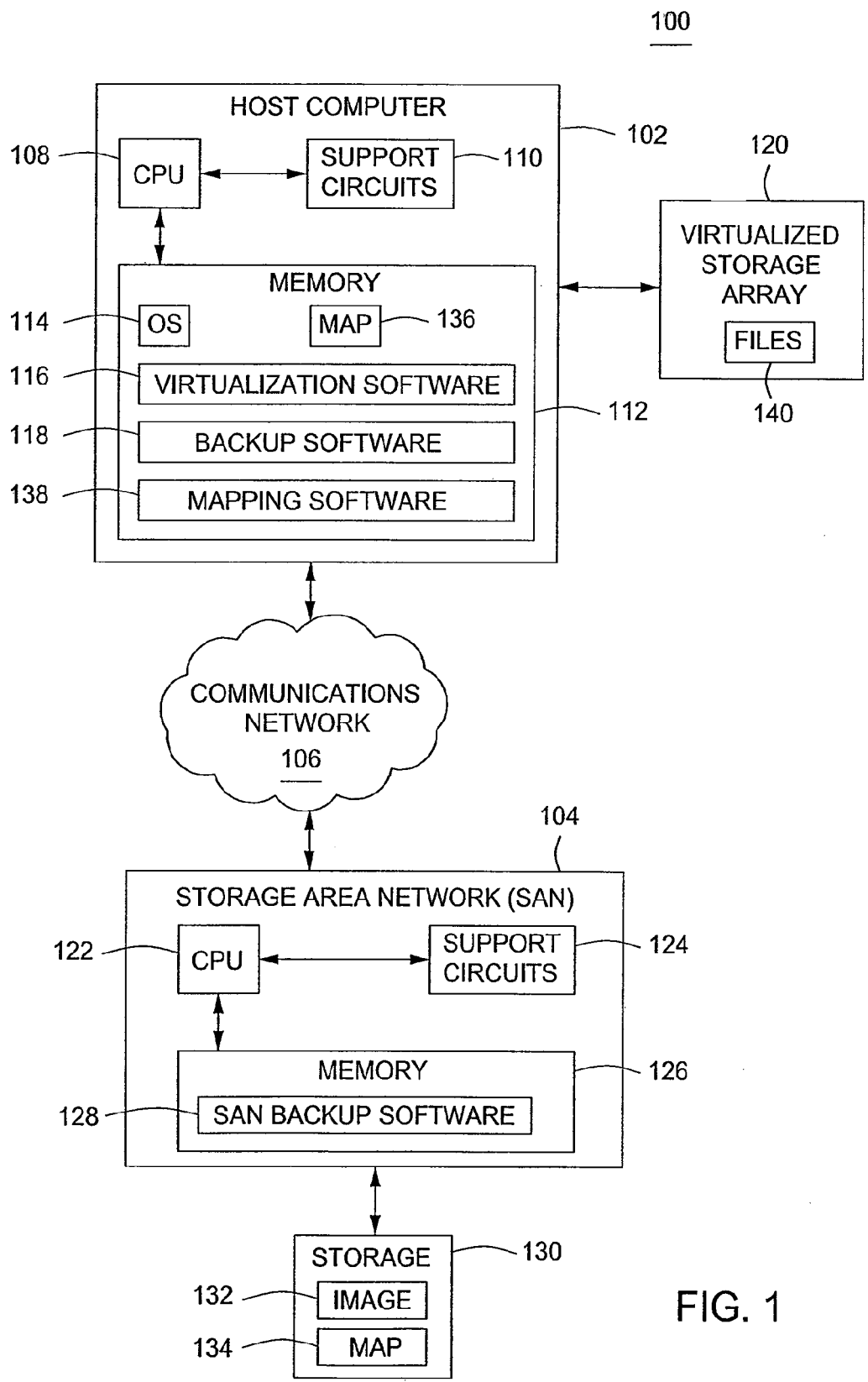
FIG. 1 is a block diagram of a system employing an apparatus for backing up files in accordance with at least one embodiment of the present invention.

FIG. 1 is a block diagram of a system 100 employing an apparatus for backing up and restoring files in accordance with at least one embodiment of the present invention.

The apparatus is usable for practicing a method for mapping files stored on a virtual disk of a virtual machine such that individual files on the virtual disk can be accessed. Such individual file access can facilitate a number of utilities for virtual machines including backing up and restoring files, in conformity with the principles of the present invention. Details in connection with the method are discussed with reference to FIGS. 2 and 3 below.

The system 100 comprises a host 102, a storage area network (SAN) 104 and a communications network 106. As described below, the SAN 104 represents one particular embodiment of a storage system that can benefit from virtual disk mapping of the present invention.

As used in the current context, the term "apparatus" implies (or refers to) backup/restore software designed and implemented in accordance with the principles of the present invention.

Host 102 is a computing device comprising a (meaning "at least one" unless otherwise specified) central processing unit (CPU) 108, support circuits 110 and a memory 112. The CPU 108 may comprise one or more commercially available microprocessors or microcontrollers that facilitate data processing and storage. The support circuits 110 facilitate operation of the CPU 108 and comprise at least one of clock circuits, power supplies, cache, input/output circuits, and the like. The memory 112 comprises at least one of read only memory (ROM), random access memory (RAM), disk drive storage, optical storage, removable storage, and the like. The memory 112 further comprises an operating system 114, a virtualization software 116, mapping software 138 and backup software 118.

As used herein, the term "virtualization software or VS" refers to a program facilitating concurrent implementation of multiple operating systems (OS) on a single computer. This is analogous to having many computers inside one computer. Noticeable here is the fact that traditional methods of running multiple OSs (i.e. by partitioning hard drive and creating a dual-boot) have two main limitations: only one OS runs at a time and the physical hardware on the computer limits user choices. For instance, in most cases a Mac OS fails to run on a PC. However, virtualization changes this because the software runs as an application on a PC and emulates hardware, so hardware compatibility is not an issue. The virtualization program pretends to be a computer. Thus, each operating system installed on the PC will act as a new computer. For instance, a computer with VS installed can run as a Linux server, two Windows servers and three other Linux servers thereby allowing the user to access a total of six servers at the same time (i.e. five guests and one host) through one PC. On the network, each server appears as a unique system.

The term "backup software", as used in the current context, refers to software designed to backup data for the purpose of having a second copy of an original source in case of damage to the original data source. Some of the key features of backup software are volumes, data compression, remote backup, access to open files, schedules and the like.

As used in the current context, the term "virtualization" refers to integration of one or more back end services or functions with additional front end functionality for the purpose of providing useful abstractions. Typically virtualization hides some of the back end complexity, or adds/integrates new functionality with existing back end services. Examples of virtualization are the aggregation of multiple instances of a service into one virtualized service, or to add security to an otherwise insecure service. Virtualization can be nested or applied to multiple layers of a system.

Virtualization when implemented in a storage subsystem is storage subsystem virtualization. It may be noted that an integrated collection of storage controllers and/or host bus adapters (HBAs), storage devices, such as disks, CDROMs, tapes, media loaders and robots and any required control software that provides storage services to one or more computers.

The application of virtualization to storage services or devices for the purpose of aggregating, hiding complexity or adding new capabilities to lower level storage resources is storage virtualization. There are typically three means of implementing storage virtualization, namely host-based, array-based and fabric-based virtualization. Firstly, host-based virtualization relies on software installed on host servers, which monitors data traffic and storage. VERITAS STORAGE FOUNDATION from SYMANTEC CORPORATION is an example of this type of product. Secondly, array-based virtualization integrates the technology directly into the storage array itself. Thirdly, fabric-based virtualization runs dedicated software on intelligent switch devices. Each approach offers unique advantages and disadvantages that can impact its performance, scalability, cost and reliability.

Virtualization can be performed in server/host, network (that is switch or network storage appliance), storage subsystem (disk drive/array or tape library) and the like. Examples include separate devices that aggregate multiple individual file-system appliances or block-storage subsystems into one virtual service (storage pool), or storage area network (SAN) switch-based functions providing transparent block or file-system mirroring functions.

Host 102 is coupled to a virtualized storage array 120. The virtualized storage array 120 is the result of implementation of virtualization in the storage array. Host 102 and the storage array network (SAN) 104 are coupled through the communications network 106.

SAN 104 typically consists of multiple servers, online storage (disk) and offline storage (tape or optical), all of which are connected to a Fibre Channel switch or hub. Each server in the SAN is granted full read/write access to any disk or tape drive within the SAN. This allows for LAN-free, Client-free, and Server-free backups.

SAN 104 comprises a computing device comprising a (meaning "at least one" unless otherwise specified) central processing unit (CPU) 122, support circuits 124 and a memory 126. The CPU 122 may comprise one or more commercially available microprocessors or microcontrollers that facilitate data processing and storage. The support circuits 124 facilitate operation of the CPU 122 and comprise at least one of clock circuits, power supplies, cache, input/output circuits, and the like. The memory 126 comprises at least one of read only memory (ROM), random access memory (RAM), disk drive storage, optical storage, removable storage, and the like. The memory 126 further comprises SAN backup software 128.

SAN backup software 128 deployed provides dynamic device sharing such that servers on multiple platforms, such as WINDOWS and NETWARE and the like, share all the resources within the tape library, including drives, slots as well as media. The SAN backup software 128 assigns any available drive or slot for backup to the request server regardless of the platform the server is on. At the same time, SAN servers on both platforms should be able to share tape media (i.e. read and write to the same tape media) to ensure media maximization. By having SAN backup software 128 that provides full sharing of SAN devices, the user can ensure that SAN investment is maximized.

Attached to the SAN 104 is storage 130. Storage 130 comprises an image 132 and a map 134. The storage 130 may comprise at least one of a disk drive, a disk drive array, an optical storage system, a tape drive or the like.

In certain embodiments, the host 102 is a virtual machine (or GUEST OS) comprising the virtualized storage array (or virtual drive array) 120, which is backed up to the SAN 104.

As used in the current context, the term "virtual machine" refers to software that creates a virtualized environment between the computer platform and its operating system, so that the end user can operate software on an abstract machine. Specifically, the term virtual machine has several distinct meanings. For example, the original meaning of virtual machine, sometimes called a hardware virtual machine, is that of a number of discrete identical execution environments on a single computer, each of which runs an OS. This allows applications written for one OS to be executed on a machine which runs a different OS or provide execution "sandboxes", which provide a greater level of isolation between processes than is achieved when running multiple processes on the same instance of an OS. One use is to provide multiple users the illusion of having an entire computer, one that is their "private" machine, isolated from other users, all on a single physical machine. Another advantage is that booting and restarting a virtual machine is much faster than a physical machine, since it may be possible to skip tasks such as hardware initialization.

As stated earlier, in certain applications there is a need to backup the virtual computer (GUEST OS) 102 comprising the virtual drive array 120 to the SAN 104. For example, applications that demand performance of off-host backup of a VMWARE ESX GUEST OS onto SAN. Operationally, a copy of the GUEST OS (virtual computer/machine) 102 is copied to the SAN 104. A backup proxy then backs up the GUEST OS 102 which is a collection of files that make up the virtual disk(s), but can not access individual files of that GUEST OS 102. As such, the backup software 118 will create an image of all the files (or a selected volume of files) in the virtual drive and store them as a backup image 132, for example, on the SAN 104. In other embodiments where individual files are to be utilized, an image is created and the inventive method used to map the image of the virtual disk(s) to enable access to individual files.

In use, the apparatus of the invention executes mapping software 138 to create a map 136 of the files 140 of the virtualized storage array 120 (herein referred to as virtual disk(s)). The apparatus resolves the drive partitions and volume boundaries. The apparatus parses the raw file system structures to map individual directories and files within a volume. These mappings can be used by various utilities to access a single file within the virtual disk(s) 120. One such application is to store the map 136 as a map 134 with the image 132 of the files 140 on a back up device, such as, the SAN 104. When a single file is to be restored from this image 132, the map 134 is used to find and restore the file directly from the image 132 without first mounting the image.

Figure 2:
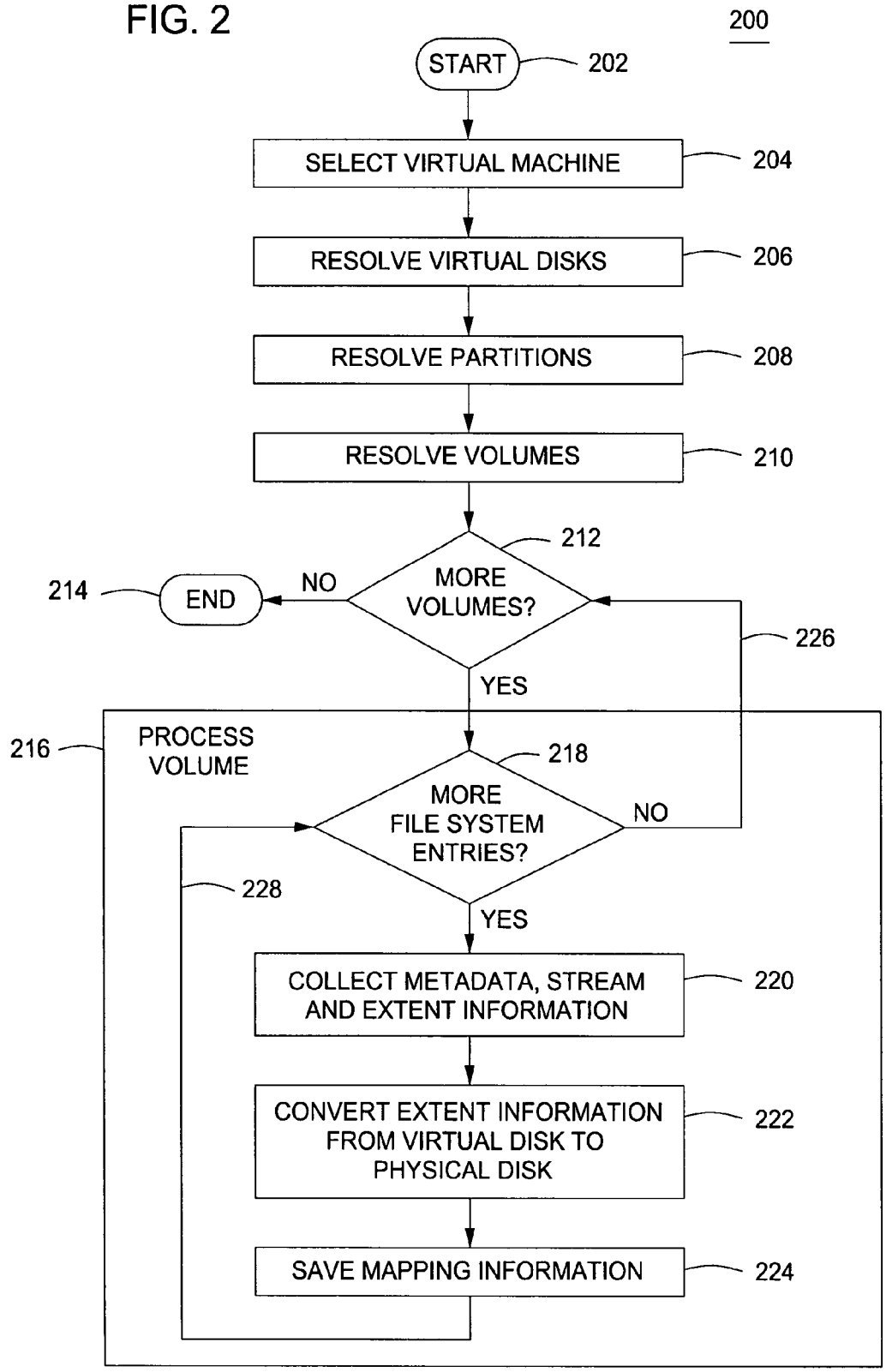
FIG. 2 depicts a flowchart for a method for mapping files of a virtual disk of a virtual machine in accordance with at least embodiment of the present invention.

FIG. 2 depicts a flowchart for a method 200 for mapping files stored on a virtual disk of a virtual machine in accordance with at least one embodiment of the present invention. Upon execution of the mapping software 138 of FIG. 1, the method 200 starts at step 202 and proceeds to step 204. At step 204, the method 200 selects a virtual machine. Related to the virtual machine will be at least one virtual disk that stores files for use by the virtual machine. The embodiments of the invention inspect the partitions, volumes, and file entry information of the at least one virtual disk to map the virtual disk to the physical disk upon which the information is actually stored. Generally, the files being processed are located in an image of the at least one virtual disk.

At step 206, the method 200 resolves the at least one virtual disk. Once the virtual disk is identified, at step 208, the method 200 resolves partitions of the virtual drive to ultimately resolve volume boundaries. In certain embodiments, the method 200 interprets the virtual disk format to understand how the disk is formatted. The method 200 examines the Master Boot Record (MBR) to determine what partitions exist and what type of partitions exist. At step 210, the method 200 resolves the volume boundaries and determines how each volume is formatted (e.g., NTFS, EXT3).

As used herein, the term "Master Boot Record or MBR or partition sector" refers to the 512-byte boot sector that is the first sector (or "Sector 0") of a partitioned data storage device, such as a hard disk. It must be noted that the boot sector of a non-partitioned device is a volume boot record.

In certain applications, a data storage device is partitioned with the MBR Partition Table scheme (that is, the conventional IBM PC partitioning scheme) thus the MBR contains the primary partition entries in its partition table. The partition table entries for other secondary partitions are stored in Extended Boot Records, BSD disklabels, and Logical Disk Manager metadata partitions that are described by those primary entries. By convention, there are exactly four primary partition table entries in the MBR Partition Table scheme, although some (rare) systems have been known to extend this to five (PTS-DOS), or even eight entries.

On the other hand, in certain other applications, a data storage device is partitioned with the GUID Partition Table scheme and thus the MBR still contains a partition table. But, the only purpose of this partition table is to indicate the existence of the GUID Table and to prevent utility programs that only understand the MBR Partition Table scheme from creating any partitions in what they would see as only free space on the disk.

At step 212, the method 200 queries whether more volumes are to be processed. If the query is negatively answered, then the method 200 ends at step 214. However, if more volumes are to be processed, then the query is affirmatively answered and the method proceeds to the process volume step 216 wherein the identified volume is processed to produce a map for the volume. On the first pass through the method after the volumes are identified in steps 206 through 210, the query at step 212 is affirmatively answered.

At step 216, the method 200 performs a number of steps that inspect the file system entries within the volume to produce the map. At step 218, the method 200 queries whether additional file system entries are to be processed. If negatively answered, the method 200 proceeds along path 226 (i.e., al file system entries of the volume have been processed) to the query of step 212 to determine whether another volume is to be processed. At step 220, the method 200 examines file system structures. In certain embodiments, the method 200 parses raw file system structures in order to map individual directories and files within a volume. For example, the raw file system structures (i.e., the MFT for Windows) of each volume is parsed to discover the mappings of individual directories and files.

As used herein, the term "file system or file system structure" refers to the way in which files are named and where they are placed logically for storage and retrieval. For example, the DOS, WINDOWS, OS/2, MACINTOSH and UNIX-based operating systems all have file systems in which files are placed somewhere in a hierarchical (tree) structure. A file is placed in a directory (folder in Windows) or subdirectory at the desired place in the tree structure. Thus, file system is a method for storing and organizing computer files and the data they contain to make it easy to find and access them. File systems may use a data storage device, such as a hard disk or CD-ROM, and involve maintaining the physical location of the files they might provide access to data on a file server by acting as clients for a network protocol, such as NFS, SMB, or 9P clients, or they may be virtual and exist only as an access method for virtual data, such as procfs. At step 220, the method 200 collects the metadata, stream information and extent information with respect to files in the volume.

At step 222, the method 200 creates a map related to an image representing stored files, wherein the map comprises file locations within the image. More specifically, the method 200 examines the collected file system structure information within the selected volume to create the map. The map consists of a conversion of the extent information of the virtual disk to the storage locations of the files on the physical disk upon which the files are stored. The map aids the method 200 in identifying the physical locations of files within the image. The mapping information is saved at step 224 as map 136 in FIG. 1. The method 200 proceeds to step 218 to query whether additional file system entries are to be processed for the presently selected volume.

In certain embodiments, the method 200 translates the directory and files mapping from the virtual volume to the physical files that make up the virtual disks. It must be noted that these mappings are used to read individual file data directly from the virtual disks.

After creating the map of the virtual disk(s), one embodiment of the invention creates one or more images of one or more volumes of the virtual disk(s). An image is a computer file containing the complete contents and structure of a data storage medium or device, such as a hard drive, hard drive array, and the like. The term has been generalized to cover any such file, whether originated from an actual physical storage device or not. As such, an image contains all the information necessary to replicate the structure and contents layout as well as the actual contents of a storage device or volume on the storage device.

In one embodiment, the image and the map may be sent to and stored in a backup storage device, such as, to the SAN. In other embodiments, the map may be used by various file utilities to access individual files in the virtual disks or in images of the volumes of the virtual disk(s).

Figure 3:
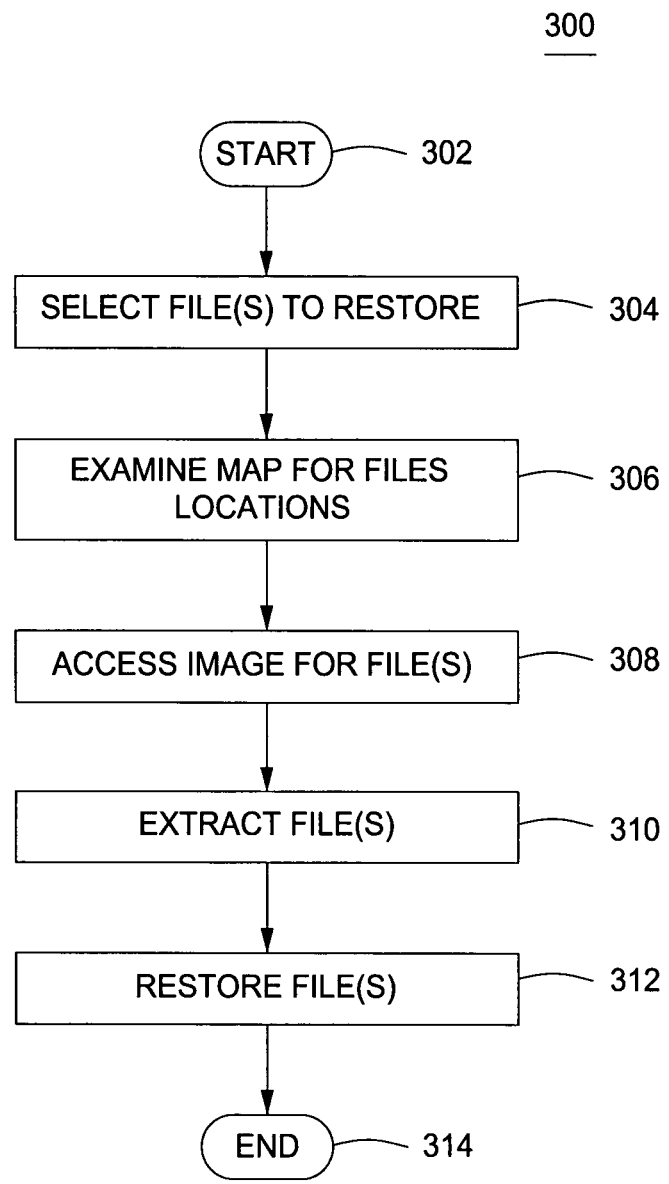
FIG. 3 depicts a flowchart for a method for restoring files in accordance with at least embodiment of the present invention.

FIG. 3 depicts a flowchart for a method for restoring files in accordance with at least embodiment of the present invention. This embodiment should be considered an example of one file utility that benefits from the present invention. Those skilled in the art will realize that other file utilities will also benefit from an ability to access individual files within a virtual disk or an image thereof. The method 300 starts at step 302 and proceeds to step 304. At step 304, the method 300 selects at least one file to restore.

At step 306, the method 300 examines a map of an image containing the at least one file, where the map identifies the location of files within the image. When a single file is to be restored, the map is used to find and restore the file directly from the image without first mounting the image.

At step 308, the method 300 accesses the image containing the files. The image may be stored in a random access type device such as a disk drive, or a serial access type device such as a tape drive. At step 310, the method 300 extracts the at least one file from the image.

At step 312, the method 300 restores the at least one file to a storage system. For example, the extracted file is restored to the virtualized storage array 120 of FIG. 1.

The various method and apparatus embodiments described herein advantageously provide for a relatively faster process for backing up a file and restoration of a specific file from the back up.

The invention is intended to cover all equivalent embodiments, and is limited only by the appended claims. Various other embodiments are possible within the spirit and scope of the invention. While the invention may be susceptible to various modifications and alternative forms, the specific embodiments have been shown by way of example in the drawings and have been described in detail herein. The aforementioned specific embodiments are meant to be for explanatory purposes only, and not intended to delimit the scope of the invention. Rather, the invention is to cover all modifications, equivalents, and alternatives falling within the spirit and scope of the invention as defined by the following appended claims.

What is claimed is:

1. A method comprising:
   identifying at least one virtual disk used by a virtual machine, wherein
      the virtual machine facilitates concurrent implementation of multiple operating systems on a single computer,
      the at least one virtual disk comprises a file system used by the virtual machine, and
      the file system comprises a file system structure and a file;
   identifying a volume implemented on the at least one virtual disk, wherein
      the identifying the volume is performed by
         examining a master boot record to identify partitions of the at least one virtual disk to identify volume boundaries, and
         identifying a volume format used by the volume;
   accessing the file system structure;
   generating a map for the volume, based upon the file system structure, wherein
      the map identifies a location of the file on a physical disk, in which the file is stored,
      the map comprises a conversion of an extent information of the file on the virtual disk to a location of the file on the physical disk,
      the file is comprised in a backup image of the at least one virtual disk,
      the map allows access to the file in the backup image, while the backup image is in an unmounted state,
      the map allows restoration of the file directly from the backup image without mounting the backup image, and
      the backup image is a point-in-time copy of the at least one virtual disk; and
   transmitting the map and the backup image to a backup storage device, wherein
      the backup storage device comprises the physical disk,
      the map and the backup image are stored on the backup storage device,
      the generating and the transmitting are performed by a computing device, and
      the computing device implements the virtual machine.

2. The method of claim 1, wherein the file system structure comprises metadata, stream information, and extent information.

3. The method of claim 1, further comprising:
   accessing the file within the backup image, based upon information identifying the location of the file within the map.

4. The method of claim 1, further comprising:
   receiving a request to restore the file within the backup image;
   accessing the map;
   accessing the location of the file identified by the map; and
   restoring the file from the backup image without mounting the backup image.

5. The method of claim 1, further comprising:
   accessing the file and using the map, while the backup image is in an unmounted state.

6. The method of claim 1, comprising:
   examining the map and the backup image comprising the file,
   identifying a location of the file within the backup image, and
   restoring the file directly from the backup image without mounting the backup image.

7. A storage device comprising program instructions executable on a computing device that implements a virtual machine to:
   identify at least one virtual disk used by the virtual machine, wherein
      the virtual machine facilitates concurrent implementation of multiple operating systems on a host computer,
      the at least one virtual disk comprises a file system used by the virtual machine, and
      the file system comprises a file system structure and a file;
   identify a volume implemented on the at least one virtual disk by
      examining a master boot record to identify partitions of the at least one virtual disk to identify volume boundaries, and identifying a volume format used by the volume;
access the file system structure;
generate a map for the volume, based upon the file system structure,
wherein
the map identifies a location of the file on a physical disk, in which the file is stored,
the map comprises a conversion of an extent information of the file on the virtual disk to a location of the file on the physical disk,
the file is comprised in a backup image of the at least one virtual disk,
the map allows access to the file in the backup image, while the backup image is in an unmounted state,
the map allows restoration of the file directly from the backup image without mounting the backup image, and
the backup image is a point-in-time copy of the at least one virtual disk; and
transmit the map and the backup image from the computing device to a backup storage device, wherein
the backup storage device comprises the physical disk, and
the map and the backup image are stored on the backup storage device.

8. The storage device of claim 7, wherein the program instructions are further executable to:
access the file within the backup image, based upon information identifying the location of the file within the map, without mounting the backup image.

9. A computing device comprising:
one or more processors, wherein the one or more processors implement a virtual machine;
memory coupled to the one or more processors, wherein the memory stores program instructions executable by the one or more processors to:
identify at least one virtual disk used by the virtual machine, wherein
the virtual machine facilitates concurrent implementation of multiple operating systems on a single computer,
the at least one virtual disk comprises a file system used by the virtual machine, and
the file system comprises a file system structure and a file;
identify a volume implemented on the at least one virtual disk by
examining a master boot record to identify partitions of the at least one virtual disk to identify volume boundaries, and
identifying a volume format used by the volume;
access the file system structure;
store the map and the backup image on a backup storage device,
generate a map for the volume, based upon the file system structure, wherein
the map identifies a location of the file on a physical disk, in which the file is stored,
the map comprises a conversion of an extent information of the file on the virtual disk to a location of the file on the physical disk,
the file is comprised in a backup image of the at least one virtual disk,
the map allows access to the file in the backup image, while the backup image is in an unmounted state,
the map allows restoration of the file directly from the backup image without mounting the backup image, and
the backup image is a point-in-time copy of the at least one virtual disk; and
transmit the map and the backup image from the computing device to a backup storage device, wherein
the backup storage device comprises the physical disk, and
the map and the backup image are stored on the backup storage device.

10. The computing device of claim 9, wherein the file system structure comprises at least one of metadata, extent information, or stream information.

11. The computing device of claim 9, wherein the program instructions are further executable to:
access the file within the backup image, based upon information identifying the location of the file within the map, without mounting the backup image.

* * * * *